(12) United States Patent
Huang et al.

(10) Patent No.: US 11,766,776 B2
(45) Date of Patent: Sep. 26, 2023

(54) METHOD FOR CONTROLLING ROBOT, STORAGE MEDIUM AND ELECTRONIC DEVICE

(71) Applicant: CLOUDMINDS (SHENZHEN) ROBOTICS SYSTEMS CO., LTD., Guangdong (CN)

(72) Inventors: William Xiao-qing Huang, Guangdong (CN); Yong Zhang, Guangdong (CN); Xubin Wei, Guangdong (CN)

(73) Assignee: CLOUDMINDS ROBOTICS CO., LTD., Shanghai (CN)

(*) Notice: Subject to any disclaimer, the term of this patent is extended or adjusted under 35 U.S.C. 154(b) by 520 days.

(21) Appl. No.: 17/032,351

(22) Filed: Sep. 25, 2020

(65) Prior Publication Data
US 2021/0008715 A1 Jan. 14, 2021

Related U.S. Application Data (63) Continuation of application No. PCT/CN2019/095283, filed on Jul. 9, 2019.

(30) Foreign Application Priority Data

Aug. 31, 2018 (CN) .......................... 201811014445.X (51) Int. Cl.
*B25J 9/16* (2006.01)
*B25J 13/00* (2006.01)
(Continued)

(52) U.S. Cl.
CPC .............. *B25J 9/161* (2013.01); *B25J 13/006* (2013.01); *B25J 19/025* (2013.01); *G08C 23/06* (2013.01); *H04B 10/25* (2013.01)

(58) Field of Classification Search
CPC .......... H04B 10/25; B25J 9/161; B25J 13/006; B25J 19/025; G08C 23/06
(Continued)

(56) References Cited

U.S. PATENT DOCUMENTS 8,014,897 B2 * 9/2011 Norman ............... G05D 1/0022
  180/8.1
2007/0223490 A1 * 9/2007 Mizutani ............ H04Q 11/0067
  370/395.6

(Continued)

FOREIGN PATENT DOCUMENTS

CN  101043276 A  9/2007
CN  204215267 U  3/2015
(Continued)

OTHER PUBLICATIONS

The Second Chinese Office Action dated Mar. 18, 2020; Appln. No. 201811014445.X.
(Continued)

*Primary Examiner* — Dalzid E Singh (57) ABSTRACT

Embodiments of the present application provide a method based on an optical fiber communication network for controlling a robot, a storage medium and an electronic device. The method includes: converting an acquired electrical control signal of the robot to an optical control signal; broadcasting the optical control signal over a downlink of the optical fiber communication network; filtering the optical control signal based on a port identifier to obtain an optical control signal corresponding to the port identifier; converting the optical control signal corresponding to the port identifier to an electrical control signal; and sending the electrical control signal to an actuator of the robot. According to the embodiments of the present application, the number of wirings inside the robot is reduced, the wiring (Continued)

complexity is reduced, and the bandwidth for communication and anti-electromagnetic interference capabilities in the control system are improved.

20 Claims, 7 Drawing Sheets

(51) Int. Cl.
  *B25J 19/02* (2006.01)
  *G08C 23/06* (2006.01)
  *H04B 10/25* (2013.01)

(58) Field of Classification Search
  USPC .......................................... 398/106
  See application file for complete search history.

(56) References Cited

U.S. PATENT DOCUMENTS

| 2014/0156073 | A1* | 6/2014 | Zhang | B25J 13/006 700/257 |
| 2016/0062046 | A1 | 3/2016 | Lee et al. | |
| 2017/0171647 | A1* | 6/2017 | Gao | H04B 10/25 |
| 2018/0359032 | A1* | 12/2018 | Sone | H04B 10/25752 |
| 2020/0228203 | A1* | 7/2020 | Maierbacher | H04B 10/116 |

FOREIGN PATENT DOCUMENTS

| CN | 104639236 A | 5/2015 |
| CN | 105790838 A | 7/2016 |
| CN | 107727283 A | 2/2018 |
| JP | 2007038360 A | 2/2007 |
| JP | 2007259048 A | 10/2007 |

OTHER PUBLICATIONS

The Extended European Search Report dated Apr. 13, 2021; Appln. No. 19854828.1.
1st Office Action dated Jan. 20, 2022 by the EP Office; Appln.No. 19854828.1.
Imai Ryusuke et al:"Cloud-based remote motion control over FTTH networks for home robotics", 2014 IEEE 3rd Global Conference On Consumer Electronics (GCCE), IEEE, Oct. 7, 2014(Oct. 7, 2014), pp. 565-566.
The First Japanese Office Action dated Nov. 2, 2021; Appln. No. 2020-543137.

\* cited by examiner

METHOD FOR CONTROLLING ROBOT, STORAGE MEDIUM AND ELECTRONIC DEVICE

CROSS-REFERENCE TO RELATED APPLICATION

This application is a continuation of International Application No. PCT/CN2019/095283, filed on Jul. 9, 2019, which claims the benefits of and priority to Chinese Application No. 201811014445.X, filed on Aug. 31, 2018, the entire contents of which are incorporated herein by reference.

TECHNICAL FIELD

The present application relates to the technical field of optical fiber communications and the technical field of robot control, and in particular, relates to a method based on an optical fiber communication network for controlling a robot, a storage medium and an electronic device.

BACKGROUND

Figure 1:
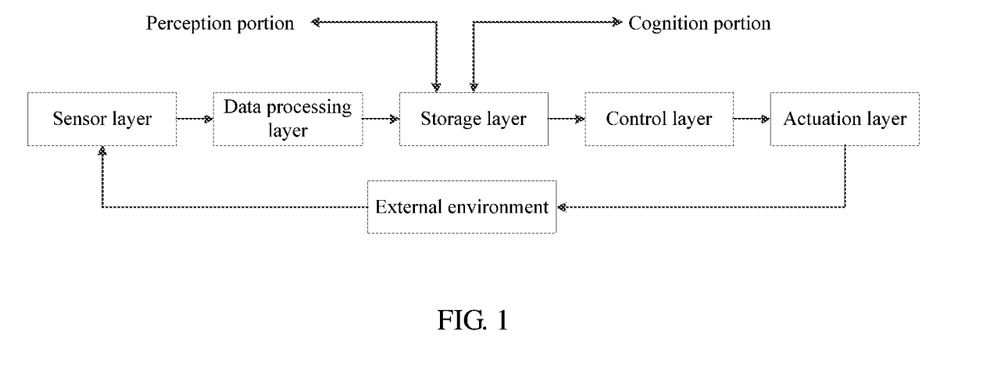
FIG. 1 is a schematic structural diagram of a control system of a robot according to an embodiment of the present application.

A control system of a robot is the brain of the robot, which is a major factor determining functionality and performance of the robot. FIG. 1 illustrates a structure of a control system of a robot. The control system includes a sensor layer, a data processing layer, a storage layer, a control layer and an actuation layer. The sensor layer acquires sensed data of an external environment, the data processing layer, the storage layer and the control layer process the sensed data, so that the external environment is perceived and cognized, and finally a feedback is given against the external environment by the actuation layer.

Figure 2:
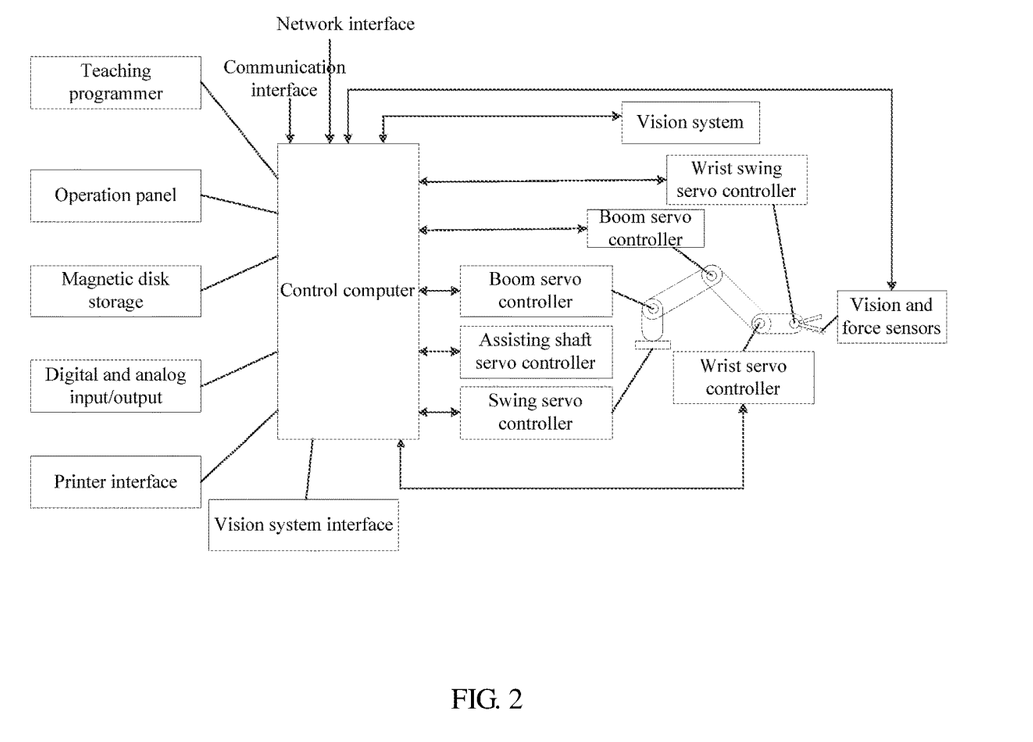
FIG. 2 is a schematic structural diagram of a motion control system of a robot according to an embodiment of the present application.

FIG. 2 is a schematic structural diagram of a motion control system of a robot. The motion control system is intended to receive a detection signal from a sensor, and drive each motor in a robot arm according to the requirement of an operation task. Like human beings whose activities rely on sensory organs, motion control of the robot depends on sensors. The robot needs sensors to detect various conditions. Signals from internal sensor of the robot are used to reflect or indicate an actual motion state of the robot arm joint, and signals from external sensor of the robot are used to detect variations of a working environment.

The motion control system of the robot includes:

an actuation mechanism—a servo motor or a stepping motor;

a driving mechanism—a servo driver or a stepping driver;

a control mechanism—a motion controller, which implements algorithm operation control for path and multi-motor synchronized driving; and a control mode—with respect to fixed action execution, a program having fixed parameters is programmed for the motion controller; and with respect to a control mode with a vision system or other sensors, a program having un-fixed parameters is programmed for the motion controller based on sensor signals.

At present, there are no worldwide internal communication standards dedicatedly for the control system of the robot. Generally, based on the system requirements, some commonly used buses, for example, Ethernet, CAN, 1394, SERCOS, USB, RS-485 and the like are used in the control system of the robot. Most conventional communication control buses may fall into two categories, the serial bus technology based on RS-485 and line driving technology, and the high-speed serial bus technology based on the real-time industrial Ethernet. However, these bus technologies have the following problems:

1. A large number of control lines are used, the wiring is complicated, and each sensor or servo system needs an independent communication line.
2. The bandwidth is low because the control lines employ the system bus technology, and employ the serial interface and the parallel interface.
3. The anti-electromagnetic interference capabilities are poor, and the control system fails to stably operate in industrial production sites with great electromagnetic interference.

It should be noted that the above information disclosed in the background portion is only used to reinforce understanding of the background of the present application. Therefore, the above information may include information of the known related arts for persons of ordinary skill in the art.

SUMMARY

Embodiments of the present application are intended to provide a method based on an optical fiber communication network for controlling a robot, a storage medium and an electronic device, such that the number of wirings inside the robot is reduced, the wiring complexity is lowered, and the bandwidth for communication and anti-electromagnetic interference capabilities in the control system are improved.

Other features and advantages of the present application become obvious over the following description in detail, or are partially derived from practice of the present application.

According to a first aspect of embodiments of the present application, a method based on an optical fiber communication network for controlling a robot is provided. The method includes:

converting an acquired electrical control signal of the robot to an optical control signal;

broadcasting the optical control signal over a downlink of the optical fiber communication network;

filtering the optical control signal based on a port identifier to obtain an optical control signal corresponding to the port identifier;

converting the optical control signal corresponding to the port identifier to an electrical control signal; and sending the electrical control signal to an actuator of the robot.

According to a second aspect of embodiments of the present application, a computer-readable storage medium is provided. The computer-readable storage medium stores a computer program, which, when being executed by a processor, causes the process to perform steps of:

converting an acquired electrical control signal of the robot to an optical control signal;

broadcasting the optical control signal over a downlink of the optical fiber communication network;

filtering the optical control signal based on a port identifier to obtain an optical control signal corresponding to the port identifier;

converting the optical control signal corresponding to the port identifier to an electrical control signal; and sending the electrical control signal to an actuator of the robot.

According to a third aspect of embodiments of the present application, an electronic device is provided. The electronic device includes:

a processing unit; and a storage unit, configured to store instructions executable by the processing unit;

wherein the processing unit is configured to perform the following operations by executing the executable instructions:

converting an acquired electrical control signal of the robot to an optical control signal;

broadcasting the optical control signal over a downlink of the optical fiber communication network;

filtering the optical control signal based on a port identifier to obtain an optical control signal corresponding to the port identifier;

converting the optical control signal corresponding to the port identifier to an electrical control signal; and sending the electrical control signal to an actuator of the robot.

As known from the above technical solutions, the embodiments of the present application have the following advantages and achieve the following beneficial effects:

According to the embodiments of the present application, an acquired electrical control signal of the robot is converted to an optical control signal; the optical control signal is broadcast over a downlink of the optical fiber communication network; the optical control signal is filtered based on a port identifier to obtain an optical control signal corresponding to the port identifier; the optical control signal corresponding to the port identifier is converted to an electrical control signal; and the electrical control signal is sent to an actuator of the robot. With the method for controlling a robot according to the embodiments of the present application, the number of wirings inside the robot is reduced, the wiring complexity is lowered, and the bandwidth for communication and anti-electromagnetic interference capabilities in the control system are improved.

It shall be appreciated that the above general description and the detailed description hereinafter are only illustrative and interpretative but not for limiting the present application.

BRIEF DESCRIPTION OF THE DRAWINGS

One or more embodiments are exemplarily described by using a diagram that corresponds to the one or more embodiments in the accompanying drawings. These exemplary descriptions do not constitute any limitation on the embodiments. Elements that have the same reference numerals in the accompanying drawings are represented as similar elements. Unless specifically indicated, the diagrams in the accompanying drawings do not constitute any limitations on proportions.

DETAILED DESCRIPTION

For clearer descriptions of the objectives, technical solutions, and advantages of embodiments of the present application, the embodiments of the present application are described in detail with reference to accompanying drawings. However, persons of ordinary skill in the art may understand, in the embodiments of the present application, more technical details are provided for readers to better understand the present application. However, even without these technical details and various variations and modifications based on the embodiments hereinafter, the technical solutions of the present application may also be practiced.

In addition, the described characteristics, structures, or features may be incorporated in one or more embodiments in any suitable way. In the description hereinafter, more details are provided such that sufficient understanding of the embodiments of the present application may be achieved. However, a person skilled in the art would be aware that the technical solutions of the present application may be practiced without one or more of the specific details, or may be practiced using other methods, components, materials, apparatuses, steps or the like. Under other circumstances, commonly known methods, apparatuses, practices, materials or operations are not illustrated or described in detail to in case various aspects of the present application become ambiguous.

The block diagrams illustrated in the drawings are merely functional entities, but are not necessarily physically independent entities. That is, these functional entities may be implemented by means of software, or these functional entities or a portion of these functional entities may be implemented in one or a plurality of hardware modules or integrated circuits, or these functional entities may be implemented in different networks and/or processors apparatuses and/or microcontroller apparatuses.

The flowcharts in the accompanying drawings are only exemplary ones, but do not necessarily include all the content and operations/steps, or are not necessarily performed in the described sequence. For example, some operations/steps may be separated or decomposed, whereas some operations/steps may be combined or partially combined. Therefore, an actual sequence for performing the operations or steps may be variable according to the actual needs.

Figure 3:
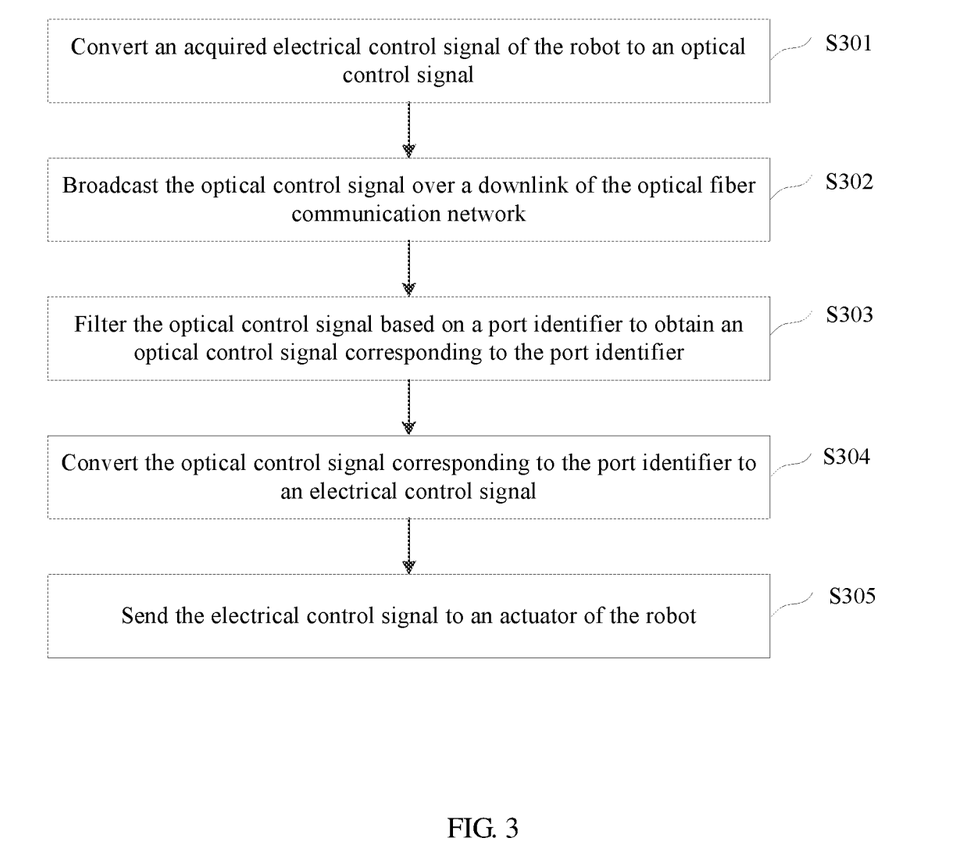
FIG. 3 is a flowchart of a method based on an optical fiber communication network for controlling a robot according to an embodiment of the present application.

FIG. 3 schematically illustrates a flowchart of a method based on an optical fiber communication network for controlling a robot according to an embodiment of the present application.

Referring to FIG. 3, the method may include the following steps:

Step S301: An acquired electrical control signal of the robot is converted to an optical control signal.

Step S302: The optical control signal is broadcast over a downlink of the optical fiber communication network.

Step S303: The optical control signal is filtered based on a port identifier to obtain an optical control signal corresponding to the port identifier.

Step S304: The optical control signal corresponding to the port identifier is converted to an electrical control signal.

Step S305: The electrical control signal is sent to an actuator of the robot.

In the method based on an optical fiber communication network for controlling a robot according to this embodiment of the present application, an acquired electrical control signal of the robot is converted to an optical control signal; the optical control signal is broadcast over a downlink of the optical fiber communication network; the optical control signal is filtered based on a port identifier to obtain an optical control signal corresponding to the port identifier; the optical control signal corresponding to the port identifier is converted to an electrical control signal; and the electrical control signal is sent to an actuator of the robot. According to this embodiment of the present application, the number of wirings inside the robot is reduced, the wiring complexity is reduced, and the bandwidth for communication and anti-electromagnetic interference capabilities in the control system are improved.

Hereinafter, the steps of the method based on an optical fiber communication network for controlling a robot according to this embodiment of the present application is described in detail with reference to the drawings and an exemplary embodiment.

In step S301, an acquired electrical control signal of the robot is converted to an optical control signal.

In this exemplary embodiment, a control system of the robot is connected to the actuator of the robot via a passive optical transmission system. When the control system of the robot generates an electrical control signal for controlling the actuator of the robot, the electrical control signal is converted to an optical control signal via the passive optical transmission system.

In this exemplary embodiment, for example, the passive optical transmission system may be an optical line terminal (OLT), which is intended to send Ethernet data to the optical fiber communication network in a broadcasting fashion, and allocate bandwidths for each unit in the optical fiber communication network, that is, controlling a start time for sending data by each unit and a size of a sending window thereof.

In this exemplary embodiment, for example, based on the optical fiber communication network constituted by the OLT, in one aspect, the OLT aggregates the electrical control signals of the robot, and feeds the signals to the optical fiber communication network in a predetermined signal format such that the signals are transmitted to the actuator of the robot, and in another aspect, the OLT feeds sensed data acquired by a sensor of the robot to the control system of the robot based on a service type.

In this exemplary embodiment, the electrical control signal is demodulated on the optical carrier to obtain the optical control signal.

In this exemplary embodiment, for example, the OLT may be equipped with an optical module. The optical module includes a transmission portion and a reception portion, wherein the transmission portion is configured to convert the electrical control signal of the robot to the optical control signal. The optical module processes an electrical control signal having a specific bit rate by an internal drive chip to drive a semiconductor laser or a light emitting diode to emit a modulated optical control signal having a corresponding rate. The optical module is internally equipped with an optical power automatic control circuit, such that the output optical signal has a stable power. The reception portion is configured to convert the received optical signal to an electrical signal. The optical module converts an optical signal having a predetermined bit rate to an electrical signal via a photo detection diode, and outputs an electrical signal having a corresponding bit rate through a pre-amplifier.

In step S302, the optical control signal is broadcast over a downlink of the optical fiber communication network.

In this exemplary embodiment, for example, a downlink frame on the downlink of the optical fiber communication network has a time period of 125 μs. Each frame in optical fiber communication networks respectively having a downlink rate of 1.244 Gbit/s and a downlink rate of 2.488 Gbit/s has a frame length of 19940 bytes and a frame length of 38880 bytes respectively. The downlink frame is formed of a PCBd domain and a Payload domain, wherein the PCBd domain is a physical control block, and the Payload domain indicates payload data. Regardless of which downlink rate the optical fiber communication network employs, the PCBd domain has an identical length, but the length of the Payload domain may be different. In the downlink direction, the OLT sends a PCBd domain message in a broadcasting fashion, and each optical network unit (ONU) receives this message and performs a corresponding operation.

In step S303, the optical control signal is filtered based on a port identifier to obtain an optical control signal corresponding to the port identifier.

In this embodiment, before the optical control signal is filtered, the optical control signal needs to be split by an optical distribution network (ODN). The ODU is configured to establish an optical channel between the control system of the robot and the actuator of the robot, such that the control system of the robot may transmit a control signal to the actuator of the robot, or transmit the sensed data acquired by the sensor of the robot to the control system of the robot.

In this exemplary embodiment, the ONU corresponding to the actuator of the robot selectively receive the optical control signal broadcast in the optical fiber communication network. Specifically, the ONU may selectively receive the broadcast optical control signal based on identifier information of an ONU port, and separates an optical control signal corresponding to the ONU port from the broadcast optical control signal. The identifier information of the ONU port one-to-one corresponds to the actuator of the robot to implement precise control for the robot.

In step S304, the optical control signal corresponding to the port identifier is converted to an electrical control signal.

In this exemplary embodiment, the ONU corresponding to the actuator of the robot may demodulate the optical control signal, and upon obtaining the electrical control signal corresponding to the actuator of the robot, the ONU may transmit a control instruction to the actuator of the robot connected to the ONU via an electrical signal.

In step S305, the electrical control signal is sent to an actuator of the robot.

Figure 4:
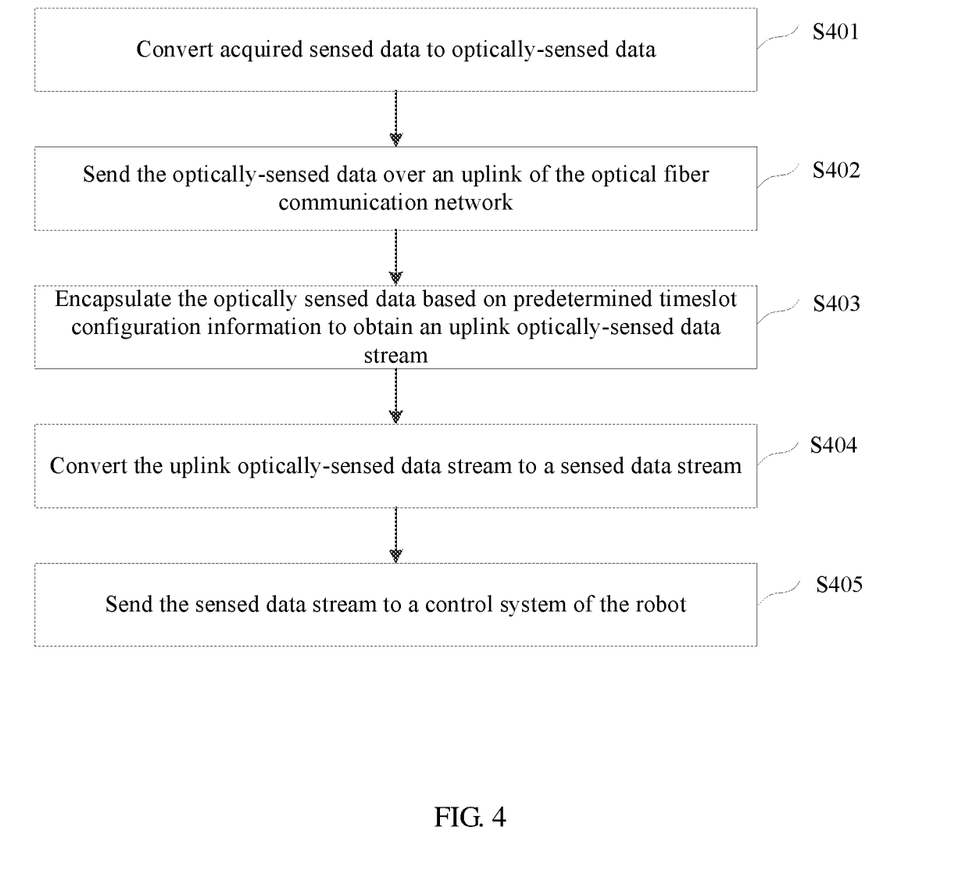
FIG. 4 is a flowchart of a method for controlling a robot based on an optical fiber communication network according to another embodiment of the present application.

FIG. 4 schematically illustrates another flowchart of a method based on an optical fiber communication network for controlling a robot according to an embodiment of the present application.

Referring to FIG. 4, the method may further include the following steps:

Step S401: Acquired sensed data is converted to optically-sensed data.

In this exemplary embodiment, the robot may be equipped with a vision sensor, a slip sensor, a force sensor and the like, which is configured to send the acquired sensed data to the control system of the robot, such that the control system of the robot analyzes the sensed data and makes a decision. The sensors configured for the robot are each equipped with a corresponding ONU, which is configured to convert the sensed data to the optically-sensed data.

Step S402: The optically-sensed data is sent over an uplink of the optical fiber communication network.

Step S403: The optically sensed data is encapsulated based on predetermined timeslot configuration information to obtain an uplink optically-sensed data stream.

In this exemplary embodiment, upon receiving the optically-sensed data sent by the corresponding ONUs corresponding to the sensors of the robot, an ODN encapsulates the optically-sensed data based on a predetermined timeslot configuration field, and sends an encapsulated data packet to an OLT.

In this exemplary embodiment, data may be transmitted in a time-division multiplexed fashion over an uplink of the optical fiber communication network of the robot, wherein the uplink may be divided into different timeslots. A timeslot is allocated to the ONU corresponding to each actuator of the robot and the ONU corresponding to each sensor based on an upstream bandwidth map field of the downstream frame, such that the ONU may send its own data in a predetermine sequence, and no conflict occurs.

Step S404: The uplink optically-sensed data stream is converted to a sensed data stream.

In this exemplary embodiment, a reception portion of the OLT is configured to convert the received optically-sensed data stream to the sensed data stream, and convert an input optically-sensed data stream having a specific bit rate to a sensed data stream having a specific bit rate of an electrical signal via a photo detection diode, and output a sensed data stream having a corresponding bit rate of an electrical signal via a pre-amplifier.

Step S405: The sensed data stream is sent to a control system of the robot.

It should be noted that the above steps are merely intended to exemplarily illustrate the method according to this exemplary embodiment, instead of limiting the method. For ease of understanding, the above steps do not represent or designate a time sequence of these steps. In addition, for ease of understanding, these steps may be performed in a plurality of modules synchronously or asynchronously.

According to this embodiment of the present application, acquired sensed data is converted to optically-sensed data, the optically-sensed data is sent over an uplink of an optical fiber communication network, the optically-sensed data is encapsulated based on predetermined timeslot configuration information to obtain an uplink optically-sensed data stream, the optically-sensed data stream is converted to a sensed data stream, and the sensed data stream is sent to a control system of the robot. In this way, the wiring complexity inside the robot is reduced, and the bandwidth for communication and anti-electromagnetic interference capabilities in the control system are improved.

Hereinafter apparatus embodiments of the present application are described, and the apparatus may be configured to perform the method based on an optical fiber communication network for controlling a robot according to the present application.

Figure 5:
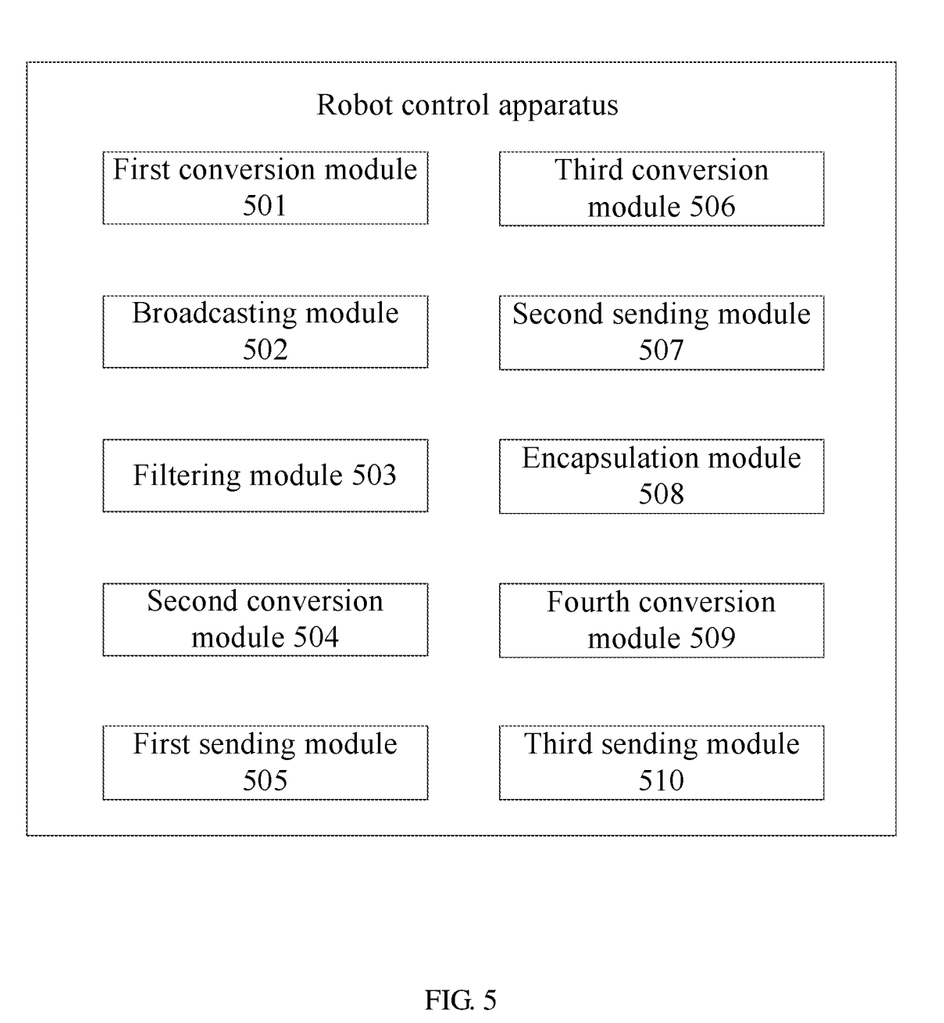
FIG. 5 is a functional block diagram of an apparatus based on an optical fiber communication network for controlling a robot according to an embodiment of the present application.

FIG. 5 schematically illustrates a structural diagram of a robot apparatus based on an optical fiber communication network according to an embodiment of the present application.

Referring to FIG. 5, an embodiment of the present application further provides an apparatus based on an optical fiber communication network for controlling a robot. The apparatus includes: a first conversion module 501, a broadcasting module 502, a filtering module 503, a second conversion module 504 and a first sending module 505.

The first conversion module 501 may be configured to convert an acquired electrical control signal of the robot to an optical control signal.

The broadcasting module 502 may be configured to broadcast the optical control signal over a downlink of the optical fiber communication network.

The filtering module 503 may be configured to filter the optical control signal based on a port identifier to obtain an optical control signal corresponding to the port identifier.

The second conversion module 504 may be configured to convert the optical control signal corresponding to the port identifier to an electrical control signal.

The first sending module 505 may be configured to send the electrical control signal to an actuator of the robot.

In an embodiment of the present application, the first conversion module 501 is further configured to modulate the electrical control signal on an optical carrier to obtain the optical control signal.

In an embodiment of the present application, the second conversion module 504 is further configured to demodulate the optical control signal to obtain the electrical control signal.

In addition, in an embodiment of the present application, as illustrated in FIG. 5, the apparatus based on an optical fiber communication network for controlling a robot may further include: a third conversion module 506, a second sending module 507, an encapsulation module 508, a fourth conversion module 509 and a third sending module 510.

The third conversion module 506 may be configured to convert acquired sensed data to optically-sensed data.

The second sending module 507 may be configured to send the optically sensed data over an uplink of the optical fiber communication network.

The encapsulation module 508 may be configured to encapsulate the optically sensed data based on predetermined timeslot configuration information to obtain an uplink optically-sensed data stream.

The fourth conversion module 509 may be configured to convert the uplink optically-sensed data stream to a sensed data stream.

The third sending module 510 may be configured to send the sensed data stream to a control system of the robot.

In an embodiment of the present application, the third conversion module 506 is further configured to modulate the sensed data on an optical carrier to obtain the optically-sensed data.

In an embodiment of the present application, the fourth conversion module 509 is further configured to demodulate the optically-sensed data stream to obtain the sensed data stream.

According to this embodiment of the present application, the first conversion module 501 converts an acquired electrical control signal of the robot to an optical control signal; the broadcasting module 502 broadcasts the optical control signal over a downlink of the optical fiber communication network; the filtering module 503 filters the optical control signal based on a port identifier to obtain an optical control signal corresponding to the port identifier; the second conversion module 504 converts the optical control signal corresponding to the port identifier to an electrical control signal; and the first sending module 505 sends the electrical control signal to an actuator of the robot. According to this embodiment of the present application, the number of wirings inside the robot is reduced, the wiring complexity is reduced, and the bandwidth for communication and anti-electromagnetic interference capabilities in the control system are improved.

Details of various modules in the apparatus based on an optical fiber communication network for controlling a robot have been given in detail in the description of the method based on an optical fiber communication network for controlling a robot, which are thus not given herein any further.

Figure 6:
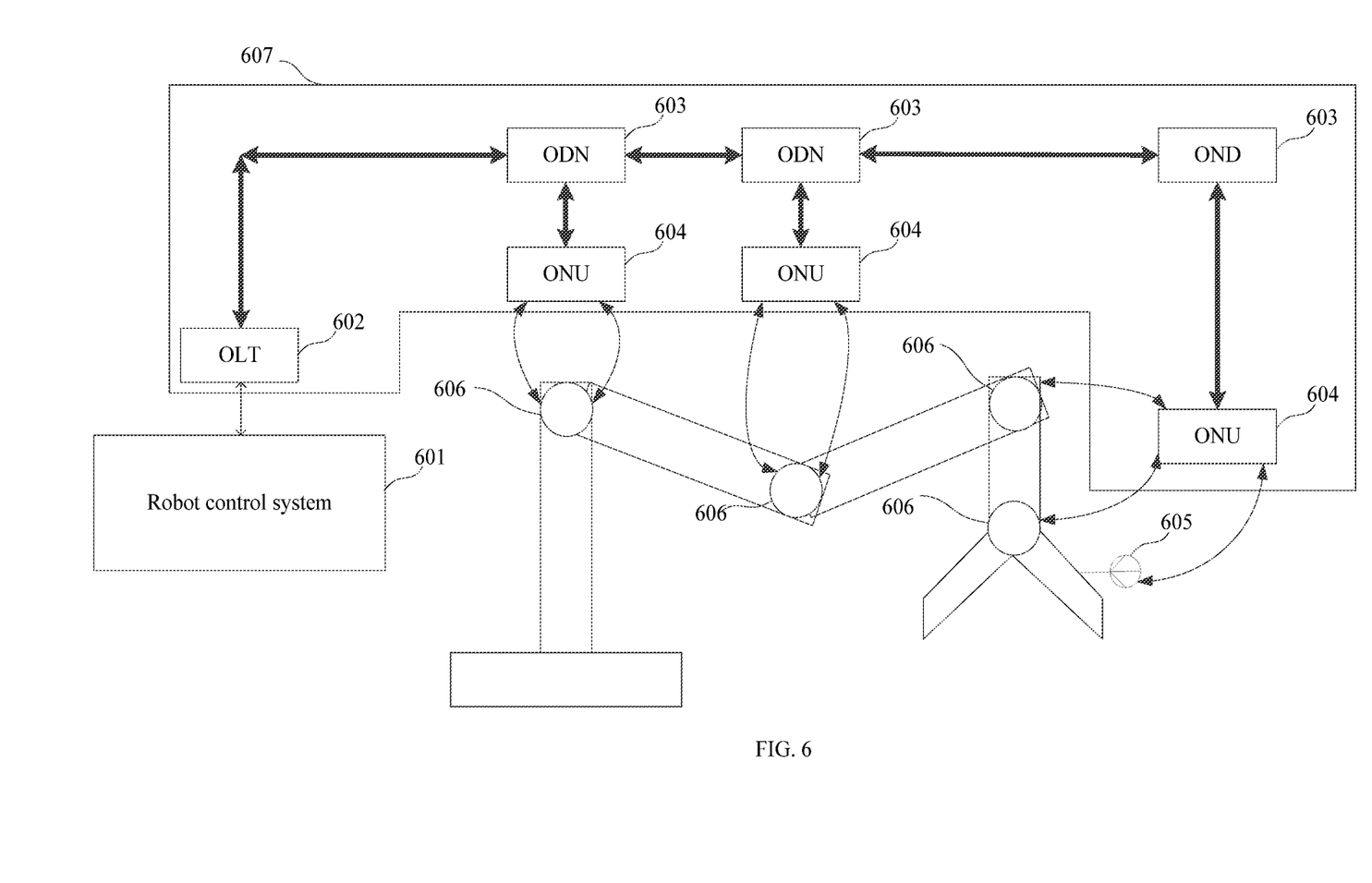
FIG. 6 is a schematic structural diagram of a robot device according to an embodiment of the present application.

FIG. 6 schematically illustrates a structural diagram of a robot device according to an embodiment of the present application.

Referring to FIG. 6, an embodiment of the present application provides a robot device. The robot device includes: a robot control system 601, an OLT 602, an ODN 603, an ONU 604, a robot sensor 605, a robot actuator 606 and an optical fiber communication network 607.

The robot control system 601 is signally connected to the OLT 601. A transmitted signal may be an electrical control signal. Upon receiving the electrical control signal transmitted by the robot control system 601, the OLT 602 aggregates the electrical control signal, and generates an optical control signal therefrom based on a predetermined signal format and feeds the generated optical control signal to the optical fiber communication network 607. The ODN 603 splits the optical control signal in the optical fiber communication network 607, and allocates the optical control signal to the ONU 604. The ONU 604 corresponding to the robot actuator 606 selectively receives the optical control signal broadcast in the optical fiber communication network 607. Specifically, the ONU 604 may selectively receive the broadcast optical control signal based on identifier information of a port of the ONU 604, and separate the optical control signal corresponding to the port of the ONU 604 from the broadcast optical control signal. The identifier information of the port of the ONU 604 one-to-one corresponds to the robot actuator 606 to implement precise control for the robot. The ONU 604 corresponding to the robot actuator 606 demodulates the optical control signal to obtain an electrical control signal corresponding to the robot actuator 606, and then transmits a control instruction to the robot actuator electronical-signally connected to the ONU 604.

In this embodiment of the present application, upon receiving optically-sensed data sent by the ONU 604 corresponding to each robot sensor 605, the ODN 603 encapsulates the optically-sensed data based on an upstream bandwidth map field of a downlink frame, and sends an encapsulated data packet to the OLT 602. A reception portion of the OLT 602 is configured to convert the received optically-sensed data stream to a sensed data stream, and convert the input optically-sensed data stream having a specific bit rate to a sensed data stream of an electrical signal via a photo detection diode, and then outputs an sensed data stream of an electrical signal having a corresponding bit rate through a pre-amplifier and sends the sensed data stream to the robot control system 601.

Since the functional modules of the apparatus based on an optical fiber communication network for controlling a robot according to this embodiment of the present application correspond to the steps of the method based on an optical fiber communication network for controlling a robot according to the above embodiment, for details that are not disclosed in the apparatus embodiment, reference may be made to the description in the method embodiment.

Figure 7:
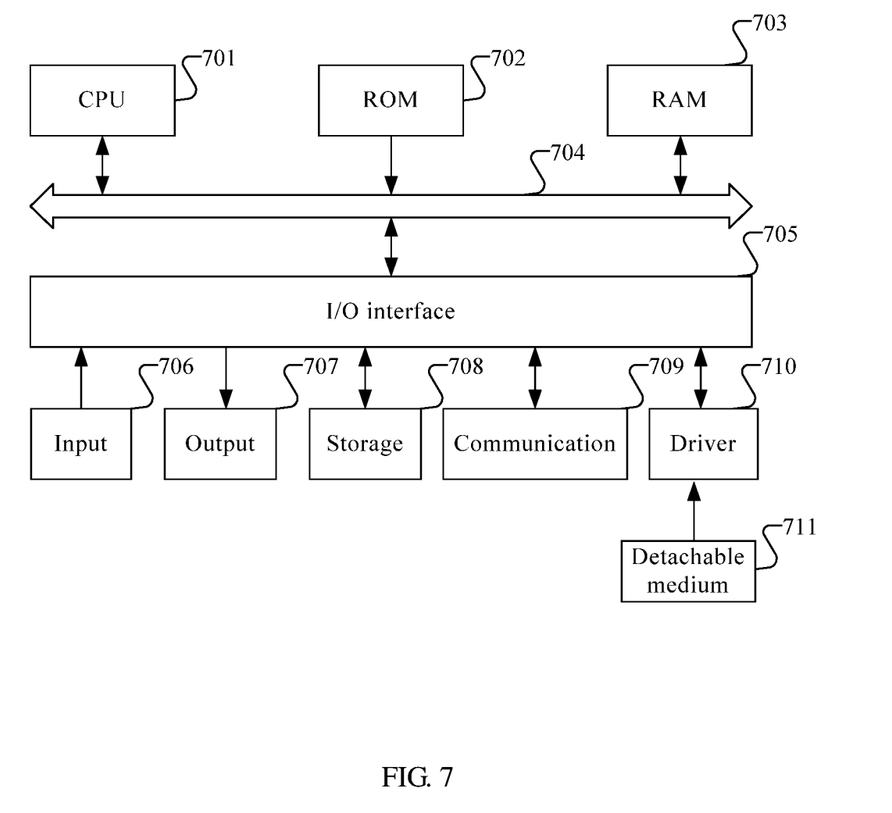
FIG. 7 is a schematic structural diagram of an electronic device according to an embodiment of the present application.

Referring to FIG. 7 hereinafter, FIG. 7 illustrates a schematic structural diagram of a computer system of an electronic device configured to perform the method according to an embodiment of the present application. The computer system of the electronic device illustrated in FIG. 7 is only an example, and shall not be considered as causing any limitation to the functions and usage range of the embodiment of the present application.

As illustrated in FIG. 7, the computer system includes a central processing unit (CPU) 701 which may perform various suitable actions or operations based on a program stored in a storage unit. The program in the storage unit may be read from a read only memory (ROM) 702 or may be loaded from a storage portion 708 to a random access memory (RAM) 703 and then read. In the RAM 703, various programs and data needed for an operating system are further stored. The CPU 701, the ROM 702 and the RAM 703 are connected to each other via a bus 704. An input/output (I/O) interface 705 is also connected to the bus 704.

An input portion 706 of a keyboard, a mouse or the like; an output portion 707 of a cathode ray transistor (CRT), a liquid crystal display (LCD) or the like, or a speaker or the like; a storage portion 708 of a hard disk or the like; and a communication portion 709 of a LAN card, a modem or the like network interface card are connected to the I/O interface 705. The communication portion 709 performs communication processing over a network such as the Internet. A driver 710 is also connected to the I/O interface 705 according to the actual needs. A detachable medium 711, such as a hard disk, an optical disk, a magneto-optical disk, a semiconductor memory or the like, is mounted on the driver 711 according to the actual needs, such that the computer program read therefrom is installed in the storage portion 708 according to the actual needs.

Particularly, according to the embodiment of the present application, the processes described above with reference to the flowcharts may be practiced as a computer software program. For example, an embodiment of the present application provides a computer program product which includes a computer program borne on a computer-readable medium; where the computer program includes program code configured to perform the methods in the flowcharts. In such an embodiment, the computer program may be downloaded from the network via a communication part 709 and installed, and/or installed from a detachable medium 711. When the computer program is executed by a central processing unit (CPU) 701, the above functions defined in the systems according to the present application are implemented.

It should be noted that the computer-readable medium according to the present application may be a computer-readable signal medium or a computer-readable storage medium or any combination thereof. The computer-readable medium may be, but not limited to, for example, electrical, magnetic, optical, electromagnetic, infrared or semiconductor system, apparatuses or devices, or any combination thereof. A more specific example of the computer-readable storage medium includes, but not limited to: an electrical connection having one or a plurality of conducting wires, a portable computer magnetic disk, a hard disk, a random access memory (RAM), a read-only memory (ROM), an erasable programmable read-only memory (ERROM), an optical fiber, a portable compact disc read-only memory (CD-ROM or flash memory), an optical storage device, a magnetic storage device, or any combination thereof. In the present application, the computer-readable storage medium may be any tangible medium including or storing a program. The program may be used an instruction execution system, apparatus or device, or may be used by means of incorporation therewith. In the present application, a computer-readable signal medium may include data signals in the baseband or data signals which are transmitted as a portion of the carrier, and the computer-readable signal medium bears computer-readable program code. Such transmitted data signals may be, but not limited to, electromagnetic signals, optical signals or any suitable combination thereof. The computer-readable signal medium may be any computer-readable medium except the computer-readable storage medium. The computer-readable medium may send, propagate or transmit the program which is used by the instruction execution system, apparatus or device or are used by means of incorporation therewith. The program code included in the computer-readable medium may be transmitted via any suitable medium, which includes, but is not limited to, wireless manner, electric wire, optical fiber, RF and the like, or any suitable combination thereof.

An embodiment of the present application further provides a computer program product. The computer program product includes a computer program stored in a nonvolatile computer readable storage medium. The computer program includes program instructions, which, when being executed by a computer, cause the computer to perform the above method for controlling a robot based on an optical fiber communication network.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer-readable storage medium and may be executed by at least one processor. When the program runs, the steps of the methods in the embodiments are performed. The storage medium may be any medium capable of storing program code, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A method based on an optical fiber communication network for controlling a robot, comprising:
   converting an acquired electrical control signal of the robot to an optical control signal;
   broadcasting the optical control signal over a downlink of the optical fiber communication network;
   filtering the optical control signal based on a port identifier to obtain an optical control signal corresponding to the port identifier;
   converting the optical control signal corresponding to the port identifier to an electrical control signal; and
   sending the electrical control signal to an actuator of the robot.

2. The method according to claim 1, wherein the converting an acquired electrical control signal of the robot to an optical control signal comprises:
   modulating the electrical control signal on an optical carrier to obtain the optical control signal.

3. The method according to claim 1, wherein the downlink of the optical fiber communication network has a frame length of 125 μs.

4. The method according to claim 1, wherein the converting the optical control signal corresponding to the port identifier to an electrical control signal comprises:
   demodulating the optical control signal to obtain the electrical control signal.

5. The method according to claim 1, further comprising;
   converting acquired sensed data to optically-sensed data;
   sending the optically-sensed data over an uplink of the optical fiber communication network;
   encapsulating the optically-sensed data based on predetermined timeslot configuration information to obtain an uplink optically-sensed data stream;
   converting the uplink optically-sensed data stream to a sensed data stream; and
   sending the sensed data stream to a control system of the robot.

6. The method according to claim 5, wherein the converting acquired sensed data to optically-sensed data comprises:
   modulating the sensed data on an optical carrier to obtain the optically-sensed data.

7. The method according to claim 5, wherein the encapsulating the optically-sensed data based on predetermined timeslot configuration information to obtain an uplink optically-sensed data stream comprises:
   encapsulating the optically-sensed data in a predetermined sequence based on an uplink bandwidth allocation field carried in the downlink to generate the uplink optically-sensed data stream.

8. The method according to claim 5, wherein the converting the uplink optically-sensed data stream to a sensed data stream comprises:
   demodulating the optically-sensed data stream to obtain the sensed data stream.

9. A non-transitory computer readable storage medium having executable programming instructions stored thereon, wherein the executable programming instructions is executable to perform the steps of:
   converting an acquired electrical control signal of the robot to an optical control signal;
   broadcasting the optical control signal over a downlink of the optical fiber communication network;
   filtering the optical control signal based on a port identifier to obtain an optical control signal corresponding to the port identifier;
   converting the optical control signal corresponding to the port identifier to an electrical control signal; and
   sending the electrical control signal to an actuator of the robot.

10. The storage medium according to claim 9, wherein the converting an acquired electrical control signal of the robot to an optical control signal comprises:
  modulating the electrical control signal on an optical carrier to obtain the optical control signal.

11. The storage medium according to claim 9, wherein the downlink of the optical fiber communication network has a frame length of 125 μs.

12. The storage medium according to claim 9, wherein the converting the optical control signal corresponding to the port identifier to an electrical control signal comprises;
  demodulating the optical control signal to obtain the electrical control signal.

13. The storage medium according to claim 9, wherein the executable programming instructions is further executable to perform the steps of:
  converting acquired sensed data to optically-sensed data;
  sending the optically-sensed data over an uplink of the optical fiber communication network;
  encapsulating the optically-sensed data based on predetermined timeslot configuration information to obtain an uplink optically-sensed data stream;
  converting the uplink optically-sensed data stream to a sensed data stream; and
  sending the sensed data stream to a control system of the robot.

14. The storage medium according to claim 13, wherein the converting acquired sensed data to optically-sensed data comprises:
  modulating the sensed data on an optical carrier to obtain the optically-sensed data.

15. The storage medium according to claim 13, wherein the encapsulating the optically-sensed data based on predetermined timeslot configuration information to obtain an uplink optically-sensed data stream comprises:
  encapsulating the optically-sensed data in a predetermined sequence based on an uplink bandwidth allocation field carried in the downlink to generate the uplink optically-sensed data stream.

16. The storage medium according to claim 13, wherein the converting the uplink optically-sensed data stream to a sensed data stream comprises:
  demodulating the optically-sensed data stream to obtain the sensed data stream.

17. An electronic device, comprising:
  a processing unit; and
  a storage unit, configured to store instructions executable by the processing unit;
  wherein the processing unit is configured to perform the following operations by executing the executable instructions:
  converting an acquired electrical control signal of the robot to an optical control signal;
  broadcasting the optical control signal over a downlink of the optical fiber communication network;
  filtering the optical control signal based on a port identifier to obtain an optical control signal corresponding to the port identifier;
  converting the optical control signal corresponding to the port identifier to an electrical control signal; and
  sending the electrical control signal to an actuator of the robot.

18. The electronic device according to claim 17, wherein the converting an acquired electrical control signal of the robot to an optical control signal comprises:
  modulating the electrical control signal on an optical carrier to obtain the optical control signal.

19. The electronic device according to claim 17, wherein the downlink of the optical fiber communication network has a frame length of 125 μs.

20. The electronic device according to claim 17, wherein the converting the optical control signal corresponding to the port identifier to an electrical control signal comprises:
  demodulating the optical control signal to obtain the electrical controlsignal.

* * * * *